United States Patent

Park et al.

[11] Patent Number: 6,147,806
[45] Date of Patent: Nov. 14, 2000

[54] APPARATUS AND A METHOD FOR SEPARATING A LIGHT BEAM USING A HYBRID DICHROIC MIRROR AND A METHOD FOR MANUFACTURING THE APPARATUS

[75] Inventors: Jung Ho Park, Sungnam; Young Jun Park, Euwang; Young Mo Hwang, Seoul, all of Rep. of Korea

[73] Assignee: Samsung Electronics Co., Ltd., Suwon, Rep. of Korea

[21] Appl. No.: 09/090,241

[22] Filed: Jun. 4, 1998

[30] Foreign Application Priority Data

Jul. 5, 1997 [KR] Rep. of Korea ............... 97-31210

[51] Int. Cl.[7] ............... G02B 27/14; G02B 5/12; G02F 1/03
[52] U.S. Cl. ............... 359/634; 359/247; 359/254; 359/586
[58] Field of Search ............... 359/634, 247, 359/254, 586

[56] References Cited

U.S. PATENT DOCUMENTS

| | | | |
|---|---|---|---|
| 4,125,864 | 11/1978 | Aughton | 358/298 |
| 4,533,215 | 8/1985 | Trias et al. | 350/347 E |
| 4,720,747 | 1/1988 | Crowley | 358/231 |
| 5,071,225 | 12/1991 | Inoue | 359/634 |
| 5,253,073 | 10/1993 | Crowley | 358/231 |
| 5,311,321 | 5/1994 | Crowley | 348/760 |

FOREIGN PATENT DOCUMENTS

| | | |
|---|---|---|
| 0 211 596 | 2/1987 | European Pat. Off. . |
| 55-25045 | 2/1980 | Japan . |

*Primary Examiner*—Georgia Epps
*Assistant Examiner*—Michael A Lucas
*Attorney, Agent, or Firm*—Burns, Doane, Swecker & Mathis, L.L.P.

[57] ABSTRACT

A light separation apparatus using a flat plate including a wide band anti-reflection coating film, first and second dichroic mirrors, a wide band high-reflection coating film, an anti-reflection coating film, and a material forming the flat plate. The wide band anti-reflection coating film allows an incident light beam generated by a light source to penetrate into the material at a first angle without reflection. The first dichroic mirror allows only a light beam with a first wavelength to penetrate at the first angle and reflects light beams with other wavelengths at the second angle. The high-reflection coating film reflects at a second angle the light beam reflected by the first dichroic mirror. The second dichroic mirror allows only a light beam with a second wavelength to penetrate outside the material at the first angle so that it is parallel to the light beam with the first wavelength penetrated through the first dichroic mirror. The second dichroic mirror also reflects the light beam with a third wavelength at a second angle. The high-reflection coating film reflects the light beam reflected from the second dichroic mirror at the second angle. The anti-reflection coating film allows the light beam with the third wavelength to penetrate outside the material at the first angle without reflection so that it is parallel to the light beam with the second wavelength penetrated through the second dichroic mirror. The light beam penetrated through the wide band anti-reflection coating film and the light beams reflected from the first dichroic mirror, the second dichroic mirror, and the wide band high-reflection coating film pass through the material.

15 Claims, 3 Drawing Sheets

APPARATUS AND A METHOD FOR SEPARATING A LIGHT BEAM USING A HYBRID DICHROIC MIRROR AND A METHOD FOR MANUFACTURING THE APPARATUS

FIELD OF THE INVENTION

The present invention relates to an apparatus for separating white-light into three colors of red, blue, and green, and the method for light separation. More particularly, the present invention relates to a method for separating a light beam from a light source into three colors by a mirror mechanism into which it is admitted, which mechanism has been constructed in a particular way. Additionally, the present invention relates a method for manufacturing the mirror. The field of application of the system is, for example, light separation in devices such as, color scanners and color copiers (copying machines). The apparatus is used for a method of display projection which modulates light independently for each color by a modulator, such as a 3-channel acousto-optic modulator, operating according to an image signal, and projects the modulated images of each single color of red, green, and blue on a screen. In addition to above example, there are many other uses.

DESCRIPTION OF THE RELATED ART

The prior typical means of light separation separates the light using a prism or a dichroic mirror as illustrated in FIG. 3. However, it is not easy to achieve optical efficiency and optical alignment with such devices. Further, the prior art in EPO 0,211,596 A2 uses three lasers with a 600 nm band wavelength (red), a 500 nm band wavelength (green), and a 400 nm band wavelength (blue), respectively, as the light source. However, this system has disadvantages in that it is very complicated and massive.

The prior acousto-optic modulator using a method for separating light modulates the light by using three lasers with a 600 nm band wavelength (red), a 500 nm band wavelength (green), and a 400 nm band wavelength (blue) respectively as a three-color light source for the input device. By using this light source, the system has to be very large, and it is difficult to commercialize. Therefore, over time, the prior large systems have been simplified to be made into smaller systems. In one case, a white-laser (composed of krypton gas and argon gas) is used for a laser light source. The light beam generated by the laser is separated into the three colors (red, green, and blue) using three dichroic mirrors as illustrated in FIG. 3. This prior system also uses three light separation mirrors and three optic modulators, one for each color, so the system has disadvantages, in that it is not compact and it is expensive.

U.S. Pat. No. 4,125,864 discloses that a plurality of parallel emergent beams of substantially equal intensity can be obtained from the incident light beam with a short wavelength for applying to the image copying system such as a printer. The patent discloses a beam splitter such that it separates a light beam with a single wavelength into a number of beams with substantially equal intensity. These beams contribute to the formation of the half-tone dots in the image, so the principle of operation is different from the present invention of a 3channel light separator for a display.

Japanese Laid Open Patent No. 55-25045 discloses a method of optical wavelength division multiplexing-branching having an optical wavelength division multiplexor and an optical wavelength branching filter to transmit a number of optical wavelengths simultaneously in the methods of optical fiber transmission. The patent discloses an optical wavelength multi-branching filter for optical communication in which the wavelength range is an infrared range from 0.7 to 1.3, and it is made so as to filter the much narrower wavelength band using an interference band-pass filter that is comprised of a multi-layer dielectric. Thus, this apparatus is different from the present invention using a dichroic mirror for high-output laser application and high efficiency filtering. In addition, in the Japanese Patent, the interference band-pass filter is arranged in order of the particular wavelengths considering the optical transmission loss characteristics of optical fibers, and the fact that the interval between each outgoing wavelength and the parallel degree is not constant. In contrast, the present invention allows the optical filter to be arranged without consideration of optical transmission loss and is constructed so as to maintenance of parallel degrees between the outgoing beams.

Another prior art is disclosed in U.S. Pat. No. 5,071,225. The patent discloses a beam splitter which splits a single incident light beam having several wavelengths into the wavelength components, respectively. For each of the wavelengths separated, the apparatus splits those beams into a plurality of partial light beams having the same wavelengths.

A plurality of secondly split light beams having the same wavelengths of U.S. Pat. No. 5,071,225, have different intensities from one another. Additionally, they do not allow the parallel degrees between outgoing beams to be maintained because the beams are split due to the difference between the refractive indexes to medium by wavelengths and the outgoing angles of the outgoing beams are different from one another.

SUMMARY

The present invention is intended to provide a method for separating a light beam into three light beams having different colors (red, green, and blue) by using a white-laser (composed of krypton gas and argon gas) as a laser light source, which is far more compact than prior art light separation systems.

One object of the present invention is to provide a light separation apparatus using a flat plate.

Another object of the present invention is to provide a method of light separation using a flat plate.

Another object of the present invention is to provide a method for manufacturing a light separation apparatus.

According to one embodiment, a light separation apparatus for separating an incident light beam into light beams having first, second, and third wavelengths, respectively, according to the present invention includes a wide band anti-reflection coating film, a first dichroic mirror, a second dichroic mirror, a wide band high-reflection coating film, an anti-reflection coating film, and a material. The wide band anti-reflection coating film admits at a first angle without reflection into a material the incident light beam generated by a light source. The first dichroic mirror allows only a light beam with the first wavelength to penetrate at the first angle and reflects other light beams with other wavelengths at a second angle, from the light beam admitted through the wide band anti-reflection coating film. The wide band high-reflection coating film reflects at the second angle the light beam reflected from the first dichroic mirror. The second dichroic mirror allows only a light beam with the second wavelength to penetrate at the first angle so that it is parallel to the light beam with the first wavelength penetrated through the first dichroic mirror. The second dichroic mirror also reflects the light beam with the third wavelength at the second angle. The wide band high-reflection coating film reflects the light beam reflected from second dichroic mirror at the second angle. The anti-reflection coating film allows the light beam with the third wavelength, to penetrate at the first angle without reflection so that it is parallel to the light beam with the second wavelength penetrated through the second dichroic mirror. The light beam penetrated through the wide band anti-reflection coating film and the light beam reflected from the first dichroic mirror, the second dichroic mirror, and the wide band high-reflection coating film pass through the material.

According to one embodiment of the present invention, the first angle is an angle from the vertical direction to the incidence plane and the outlet plane, and the second angle is an angle from the vertical direction to the reflection plane.

According to one embodiment of the present invention, the wide band high-reflection coating film and the wide band anti-reflection coating film are parallel to the first dichroic mirror, the second dichroic mirror and the anti-reflection coating film.

According to one embodiment of the present invention, the first dichroic mirror and the second dichroic mirror, and the anti-reflection coating film are separated by an equal distance t from the wide band high-reflection coating film and the wide band anti-reflection coating film by the material.

According to the present invention, the incident angle of the incident light beam and the thickness t of the material can be adjusted in order to adjust the interval between the light beam with the first wavelength which penetrates through the first dichroic mirror and the light beam with the second wavelength which penetrates through the second dichroic mirror or between the light beam with the second wavelength which penetrates through the second dichroic mirror and the light beam with the third wavelength which penetrates through the anti-reflection coating film.

According to one embodiment of the present invention, the interval between the light beam with the first wavelength which penetrates through the first dichroic mirror and the light beam with the second wavelength which penetrates through the second dichroic mirror is equal to the interval between the light beam with the second wavelength which penetrates through the second dichroic mirror and the light beam with the third wavelength which penetrates through the anti-reflection coating film.

According to one embodiment of the present invention, the incident light beam is white-light.

According to one embodiment of the present invention, the first wavelength, the second wavelength, and the third wavelength are a wavelength having a blue color, a wavelength having a green color, and a wavelength having a red color, respectively.

According to one embodiment of the present invention, a method of separating an incident light beam into three light beams having first, second, and third wavelengths, respectively, comprises the steps of allowing the incident light beam to penetrate into a material at a first angle without reflection, allowing only a light beam with the first wavelength to penetrate outside the material at the first angle, and first-reflecting light beams with the other wavelengths in the material at the second angle, second-reflecting the first-reflected light beam in the material at a second angle, allowing only the light beam with the second wavelength to penetrate outside the material at the first angle, and third-reflecting the light beam with the third wavelength at the second angle, fourth reflecting the third-reflected light beam in the material at the second angle and allowing the light beam with the third wavelength to penetrate outside the material at the first angle without reflection.

According to one embodiment of the present invention, a method for manufacturing an apparatus for separating an incident light beam into three light beams having first, second and third wavelengths, respectively, includes the steps of applying a wide band anti-reflection coating film to a part of a first side of a flat plate, the flat plate having thickness t, refractive index n, and the first side and a second side opposite to the first side having sufficient flatness to allow the incident light beam from a light source to penetrate at the first angle into the flat plate without reflection, applying a first dichroic mirror coating film to a part of the second side of the flat plate to allow only a light beam with the first wavelength to penetrate at the first angle and to reflect light beams with the other wavelengths at a second angle, from the light beam penetrated through the wide band anti-reflection coating film, applying a wide band high-reflection coating film on a remaining part of the flat plate of the first side of the plate to reflect the light beam reflected from the first dichroic mirror at the second angle, applying a second dichroic mirror to the second side of the flat plate adjacent to the first dichroic mirror to allow a light beam with the second wavelength to penetrate at the first angle and to reflect a light beam with the third wavelength at the second angle from the light beam penetrated through the wide band high-reflection coating film, and applying an anti-reflection coating film to the second side of the flat plate adjacent to the second dichroic mirror to allow the light beam with the third wavelength to penetrate at the first angle without reflection from the light beam reflected from the wide band high-reflection coating film.

BRIEF DESCRIPTION OF THE DRAWINGS

Other objects and advantages of the invention will become apparent upon reading the following detailed description and upon reference to the drawings.

Figure 1:
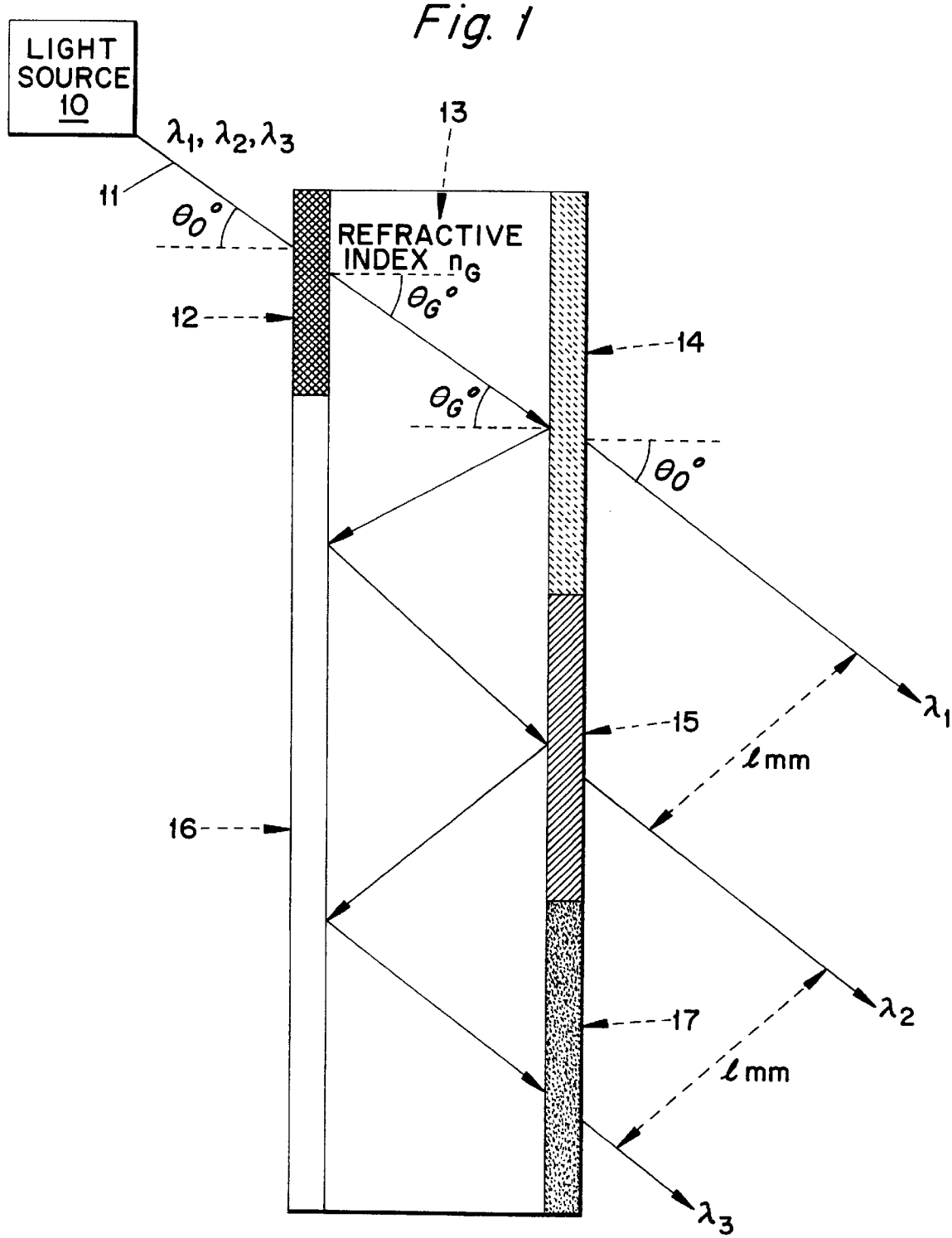
FIG. 1 illustrates a general structure of a light separation apparatus using the flat plate according to the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The invention will be explained in detail through the drawings.

According to one embodiment of the present invention, an apparatus for separating a light beam using a hybrid dichroic mirror comprises a material (13); a wide band anti-reflection coating film (12) for allowing an incident light beam (11) admitted at the first angle ($\theta_0$) from a white-light source (10)

to penetrate without reflection; a first dichroic mirror coating film (14) for allowing only a light beam with a first wavelength ($\lambda_1$) to penetrate at the first angle and for reflecting other light beams having other wavelengths at the second angle ($\theta_G$) from the light beam penetrated through the wide band anti-reflection coating film (12); a wide band high-reflection coating film (16) for reflecting at the second angle the light beam reflected by the first dichroic mirror coating film (14); a second dichroic mirror coating film (15) for allowing only a light beam with a second wavelength ($\lambda_2$) different from the first wavelength ($\lambda_1$) to penetrate at the first angle so that it is parallel to the light beam with the first wavelength ($\lambda_1$) penetrated through the first dichroic mirror coating film (14) and for reflecting a light beam with a third wavelength ($\lambda_3$) different than the first and second wavelengths ($\lambda_1$, $\lambda_2$) at the second angle, from the light beam reflected by the wide band high-reflection coating film (16); the wide band high-reflection coating film (16) reflecting at the second angle the light beam reflected from the second dichroic mirror coating film (15); an anti-reflection coating film (17) for allowing a light beam with the third wavelength to penetrate at the first angle without reflection so that it is parallel to the light beam with the second wavelength penetrated by the second dichroic mirror coating film (15) from the light beam reflected from the wide band high-reflection coating film (16); and wherein the light beam penetrated through the wide band anti-reflection coating film (12) and the light beams reflected from the first dichroic mirror coating film (14), the second dichroic mirror coating film (15) and the wide band high-reflection coating film (16) pass through the material (13).

According to one embodiment of the present invention, a method of separating a light beam comprises the steps of allowing an incident light beam to penetrate into a material at a first angle without reflection; allowing only a light beam with a first wavelength from the incident light beam to penetrate outside the material at the first angle and first-reflecting light beams with other wavelengths from the incident light beam within the material at the second angle; second-reflecting the first-reflected light beam within the material at a second angle; allowing only a light beam with a second wavelength to penetrate outside the material at the first angle and third-reflecting a light beam with a third wavelength from the second-reflected light beam at the second angle; fourth-reflecting the third-reflected light beam within the material at the second angle; and allowing the light beam with the third wavelength from the third-reflected light beam to penetrate outside the material at the first angle without reflection.

According to one embodiment of the present invention, a method for manufacturing a light separation apparatus includes the steps of applying a wide band anti-reflection coating film to a part of a first side of a flat plate, the flat plate having thickness t, refractive index n, and the first side and a second side opposite to the first side having sufficient flatness to allow an incident light beam from a light source to penetrate at the first angle into the flat plate without reflection, applying a first dichroic mirror coating film to a part of the second side of the flat plate to allow only a light beam with a first wavelength to penetrate at the first angle and to reflect light beams with other wavelengths at a second angle of the light beam penetrated through the wide band anti-reflection coating film, applying a wide band high-reflection coating film on a remaining part of the first side of the flat plate to reflect the light beam reflected from the first dichroic mirror coating film at the second angle, applying a second dichroic mirror coating film to the second side of the flat plate adjacent to the first dichroic mirror coating film to allow a light beam with a second wavelength to penetrate at the first angle and to reflect a light beam with a third wavelength at the second angle from the light beam penetrated through the wide band high-reflection coating film, and applying an anti-reflection coating film to the first side of the flat plate adjacent to the second dichroic mirror coating film to allow the light beam with the third wavelength to penetrate at the first angle without reflection from the light beam reflected from the wide band high-reflection coating film.

In particular, the present invention provides a method according to which, by concentrating the parts noted above on the flat plate, an incident white-light beam is separated into three color light beams automatically. Accordingly, the present invention has an advantage in that it is possible to make a compact system, which can be supplied at a low price. Further, it is difficult to align the light beams in the prior art method using three dichroic mirrors, respectively. In contrast, the system according to the present invention has an advantage in that the light beams are aligned automatically if the plate is sufficiently flat and has parallel sides.

FIG. 1 illustrates a general system structure to explain the light separation hybrid dichroic mirror using the flat plate according to the present invention. FIG. 1 illustrates the structure according to the present invention, including an incident white-laser light beam (11) from a light source (10), a wide band anti-reflection coating film (12), a flat plate or material (13), a dichroic mirror coating film forming first and second dichroic mirrors (14, 15), a wide band high-reflection coating film (16), and an anti-reflection coating film (17). According to one embodiment of the present invention, the light source is a white-light laser source and the material of which the flat plate is formed is a white-light transparent material.

In FIG. 1, the white-light beam (11) generated by the incident light source (10) passes through the wide band anti-reflection coating film (12) at an incident angle ($\theta_0$). The light beam (11) then hits a part of the first dichroic mirror (14) which allows the light beam having a blue color wavelength ($\lambda_1$) to penetrate outside the material and reflects the light beams having green and red wavelengths ($\lambda_2$, $\lambda_3$). The green and red wavelength light beams reflected by the first dichroic mirror (14) is totally reflected by the wide band high-reflection coating film (16) to hit the second dichroic mirror (15). The second dichroic mirror (15) allows only green wavelength light beam ($\lambda_2$) to penetrate and reflects the red wavelength light ($\lambda_3$). The red wavelength light beam ($\lambda_3$) separated by the second dichroic mirror (15) is reflected toward the wide band high-reflection coating film (16), which reflects the red wavelength light beam ($\lambda_3$) toward the anti-reflection coating film (17). The red wavelength light beam ($\lambda_3$) penetrates through the anti-reflection coating film (17) outside the material without reflection.

According to one embodiment of the present invention described above, the first wavelength, the second wavelength, and the third wavelength have different wavelengths, and in particular are a wavelength having a blue color, a wavelength having a green color, and a wavelength having a blue color, respectively. It is within the skill of the ordinary artisan to configure the system so that each of the first, second and third wavelengths can have any of the three colors, red, blue or green.

Figure 2:
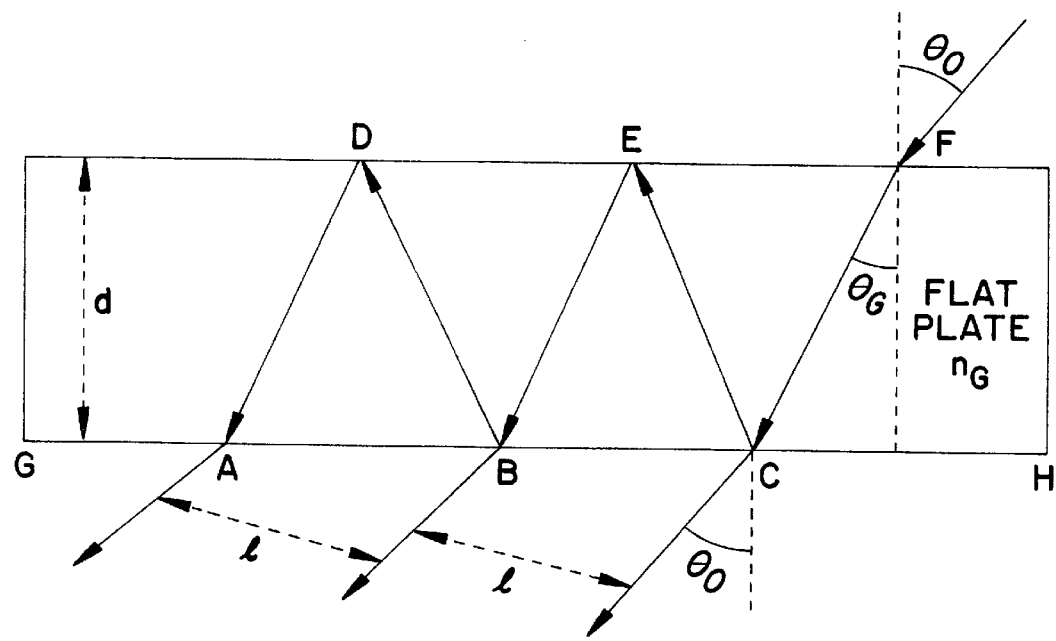
FIG. 2 illustrates the size of the light separation apparatus using the flat plate according to the present invention.
Figure 3:
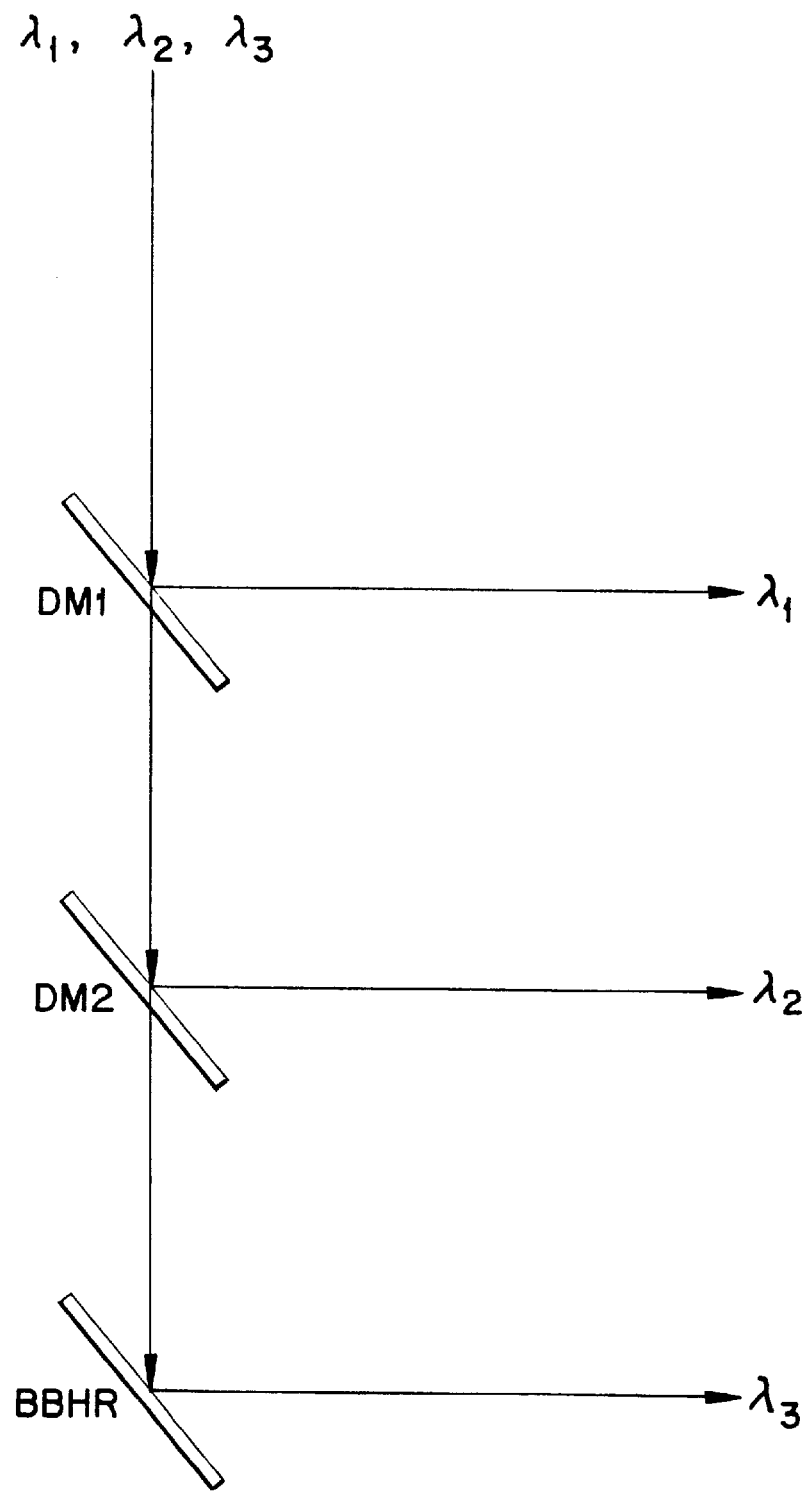
FIG. 3 illustrates a general structure of one conventional means of light separation.

The following expression determines the size of the system. In FIG. 2, when the incident light beam enters at point F at an angle of $\theta_0$ degrees, each beam interval of separated blue, green, and red light ($\lambda_1, \lambda_2, \lambda_3$, respectively) maintains a fixed 1 mm and the refractive indices of the flat plate are $n_1, n_2, n_3$, respectively according to each wavelength. The difference in the refractive indices is a negligible quantity at the area of a visible rays, so if it is assumed that the angles of refraction of the wavelengths being admitted into the flat plate plane are the same as one another, the following expression 1 determines the thickness of the flat plate.

$$d = [2 \cos \theta_0 \tan(\sin^{-1}(\sin \theta_0 / n_G))] \qquad \text{[Expression 1]}$$

Expression 2 determines the magnitudes of the width and length of the flat plate.

$$3l/\cos \theta_0 \qquad \text{[Expression 2]}$$

According to the present invention, to adjust the interval between the light beam with the first wavelength which penetrates outside the material and the light beam with the second wavelength which penetrates outside the material or between the light beam with the second wavelength which penetrates outside the material and the light beam with the third wavelength which penetrates outside the material, the incident angle of the incident light beam and the thickness t of the material are adjusted.

According to one embodiment of the present invention, the first angle is an angle from the vertical direction to the incidence plane and the outlet plane, and the second angle is an angle from the vertical direction to the reflection plane. In this case, the vertical direction refers to the thickness d of the flat plate.

According to one embodiment of the present invention, the wide band high-reflection coating film (12) and the wide band anti-reflection coating film (16) are parallel to the first dichroic mirror (14) and the second dichroic mirror (15) and the anti-reflection coating film (17).

According to one embodiment of the present invention, the first dichroic mirror (14) and the second dichroic mirror (15) and the anti-reflection coating film (17) are spaced at an equal distance t from the wide band high-reflection coating film (12) and the wide band anti-reflection coating film (16) by the material.

As stated above, compared to the prior structures of light separation sub-systems, the present invention is simple, small and the alignment of the separated three-color light beams is achieved naturally, so it is easy to manufacture. Therefore, the invention is to be used for representing large-sized displays by projecting images on a screen directly with a small-sized optical system, and is very effective for miniaturization of a system for separating light, such as a light separation sub-system.

As noted above, the present invention demonstrates the same performance with a small-sized optical separation structure as the large prior art optical systems, so it is advantageous in that it can be commercialized and simplified. In particular, by the present invention a large number of systems that are compact and have a comparatively low price can be supplied.

We claim:

1. A light separation apparatus using a flat plate formed of a material comprising:
    a wide band anti-reflection coating film for allowing an incident light beam generated by a light source to penetrate into the material at a first angle without reflection;
    a first dichroic mirror allowing only a light beam with a first wavelength to penetrate outside the material at said first angle and reflecting light beams with other wavelengths at a second angle, from the light beam penetrated through said wide band anti-reflection coating film;
    a wide band high-reflection coating film reflecting at the second angle the light beam reflected by the first dichroic mirror;
    a second dichroic mirror allowing only a light beam with a second wavelength to penetrate at the first angle so that it is parallel to the light beam with the first wavelength penetrated by the first dichroic mirror, and reflecting the light beam with a third wavelength at the second angle, from the light beam reflected from the wide band high-reflection coating film;
    the wide band high-reflection coating film reflecting at the second angle the light beam with the third wavelength reflected by the second dichroic mirror;
    an anti-reflection coating film allowing the light beam with the third wavelength to penetrate outside the material at the first angle without reflection so that it is parallel to the light beam with the second wavelength penetrated through the second dichroic mirror; and
    wherein the light beam penetrated through the wide band anti-reflection coating film and the light beam reflected by the first dichroic mirror, the second dichroic mirror, and the wide band high-reflection coating film pass through the material.

2. A light separation apparatus as set forth in claim 1, wherein the first angle is an angle from a vertical direction to an incidence plane and an outlet plane, and the second angle is an angle from the vertical direction to a reflection plane.

3. A light separation apparatus as set forth in claim 2, wherein the wide band high-reflection coating film and the wide band anti-reflection coating film are parallel to the first dichroic mirror and the second dichroic mirror and the anti-reflection coating film.

4. A light separation apparatus as set forth in claim 3, wherein the first dichroic mirror and the second dichroic mirror and the anti-reflection coating film are spaced at an equal distance t from the wide band high-reflection coating film and the wide band anti-reflection coating film by the material.

5. A light separation apparatus as set forth in claim 1, wherein an incident angle of the incident light beam and thickness t of the material can be adjusted to adjust an interval between the light beam with the first wavelength penetrated through the first dichroic mirror and the light beam with the second wavelength penetrated through the second dichroic mirror or between the light beam with the second wavelength penetrated through the second dichroic mirror and the light beam with the third wavelength penetrated through the anti-reflection coating film.

6. A light separation apparatus as set forth in claim 1, wherein the interval between the light beam with the first wavelength penetrated through the first dichroic mirror and the light beam with the second wavelength penetrated through the second dichroic mirror is equal to the interval between the light beam with the second wavelength penetrated through the second dichroic mirror and the light beam with the third wavelength penetrated through the anti-reflection coating film.

7. A light separation apparatus as set forth in claim 1, wherein said incident light beam is white-light.

8. A light separation apparatus as set forth in claim 1, wherein said light source is a white-light laser.

9. A light separation apparatus as set forth in claim 7, wherein the first wavelength, the second wavelength, and the third wavelength are a blue wavelength, a green wavelength, and a red wavelength, respectively.

10. A method of light separation using a flat plate formed of a material comprising the steps:

allowing an incident light beam which is admitted at the first angle to penetrate into the material without reflection;

allowing only a light beam with a first wavelength from the incident light beam to penetrate outside the material at the first angle and first-reflecting light beams with other wavelengths within the material at the second angle;

second-reflecting the first-reflected light beam within the material at the second angle;

allowing only a light beam with a second wavelength to penetrate outside the material at the first angle and third-reflecting a light beam with a third wavelength at the second angle from the second-reflected light;

fourth-reflecting the third-reflected light beam within the material at the second angle; and allowing the light beam with the third wavelength to penetrate outside the material at the first angle without reflection.

11. A method of light separation as set forth in claim 10, wherein the first angle is an angle from a vertical direction to an incident plane and an outlet plane and the second angle is an angle from a vertical direction to a reflection plane.

12. A method of light separation as set forth in claim 10, further comprising a step of adjusting an incident angle of the incident light and a thickness t of the material to adjust an interval between the light beam with the first wavelength penetrated outside the material and the light beam with the second wavelength penetrated outside the material or between the light beam with the second wavelength penetrated outside the material and the light beam with the third wavelength penetrated outside the material.

13. A method of light separation as set forth in claim 10, wherein the incident light beam is white-light.

14. A method of light separation as set forth in claim 13, wherein the first wavelength, the second wavelength, and the third wavelength are a blue wavelength, a green wavelength and a red wavelength, respectively.

15. A method for manufacturing a light separation apparatus using a flat plate formed of a material comprising the steps of:

applying a wide band anti-reflection coating film to a part of a first side of the flat plate, the flat plate having a thickness t, a refractive index n, and sufficient flatness of the first side and a second side opposite to the first side to allow penetration of an incident light beam generated by a light source into the material at a first angle without reflection;

applying a first dichroic mirror to a part of the second side of the flat plate to allow only a light beam with a first wavelength to penetrate at the first angle and to reflect light beams with other wavelengths at a second angle from the light beam penetrated through the wide band anti-reflection coating film;

applying a wide band high-reflection coating film to a remaining area of the first side of the flat plate to reflect the light beam reflected by the first dichroic mirror at the second angle;

applying a second dichroic mirror on the second side of the flat plate adjacent to the first dichroic mirror to allow a light beam with a second wavelength to penetrate at the first angle and to reflect a light beam with a third wavelength at the second angle; and applying an anti-reflection coating film on the second side of the flat plate adjacent to the second dichroic mirror to allow the light beam with the third wavelength to penetrate at the first angle without reflection.

* * * * *